United States Patent [19]
Johnson

[11] 3,771,480
[45] Nov. 13, 1973

[54] METHOD AND APPARATUS FOR EXTRUDING A RIVET FORM IN A LAYER OF METALLIC MATERIAL

[75] Inventor: Verner A. Johnson, Livonia, Mich.

[73] Assignee: Johnson Die & Engineering Co., Detroit, Mich.

[22] Filed: Oct. 27, 1971

[21] Appl. No.: 193,079

[52] U.S. Cl. ............. 113/1 R, 29/243.53, 29/509, 29/522, 10/27 PH, 72/358, 72/360, 113/116 R, 113/116 FF
[51] Int. Cl. .................... B21d 39/00, B21d 51/00
[58] Field of Search .................. 29/243.53, 509; 113/116 FF, 1 M, 1 F, 1 R, 121 R, 121 C, 116 R; 10/27 E, 27 PH; 72/253, 354, 358, 360, 377

[56] References Cited
UNITED STATES PATENTS

| | | | |
|---|---|---|---|
| 3,198,155 | 8/1965 | Fraze | 29/509 X |
| 3,359,935 | 12/1967 | Rosebottom | 113/1 R |
| 3,439,640 | 4/1969 | Fraze | 113/116 R |
| 3,451,367 | 6/1969 | Henrickson | 113/121 C |
| 3,557,425 | 1/1971 | Scharf | 113/1 F X |
| 3,579,809 | 5/1971 | Wolf | 29/509 |
| 3,580,200 | 5/1971 | Cvacho | 113/1 F |
| 3,638,597 | 2/1972 | Brown | 113/116 FF |

*Primary Examiner*—Charlie T. Moon
*Attorney*—Benjamin W. Colman

[57] ABSTRACT

An assembly of two layers of metallic, or a metallic and a non-metallic, material conjoined by an extruded elongated rivet formed in and from one metallic layer, staked over and about the perimeter of an opening in the second layer, is disclosed. The extruded elongated rivet may be solid or tubular and extends beyond the plane of the one layer a distance up to about 25 percent greater than the thickness of the layer from which it is formed, providing substantial rivet length to secure the second layer to the first layer. The inventive process and tooling for forming the extruded elongated rivet is also disclosed.

14 Claims, 12 Drawing Figures

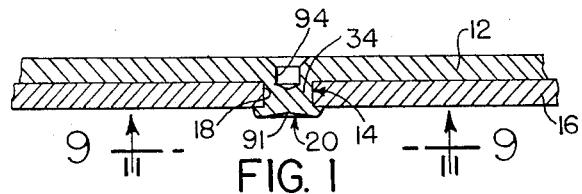
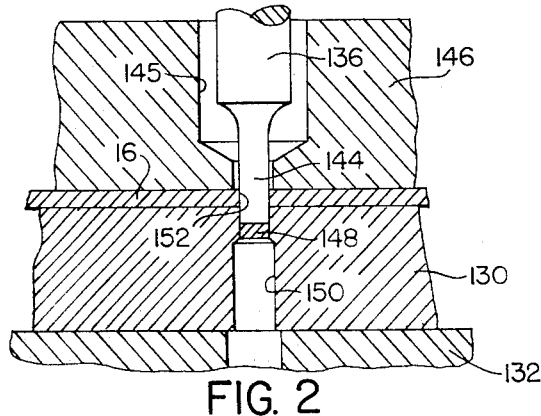
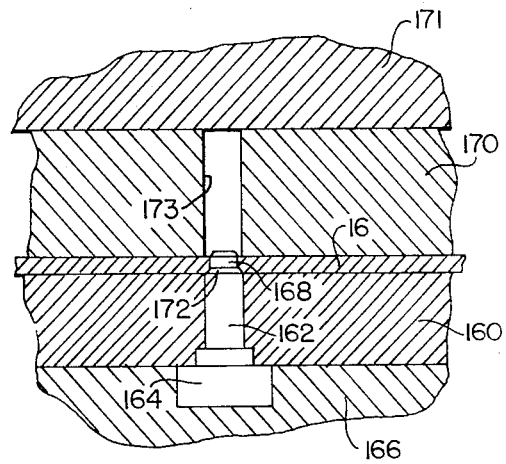
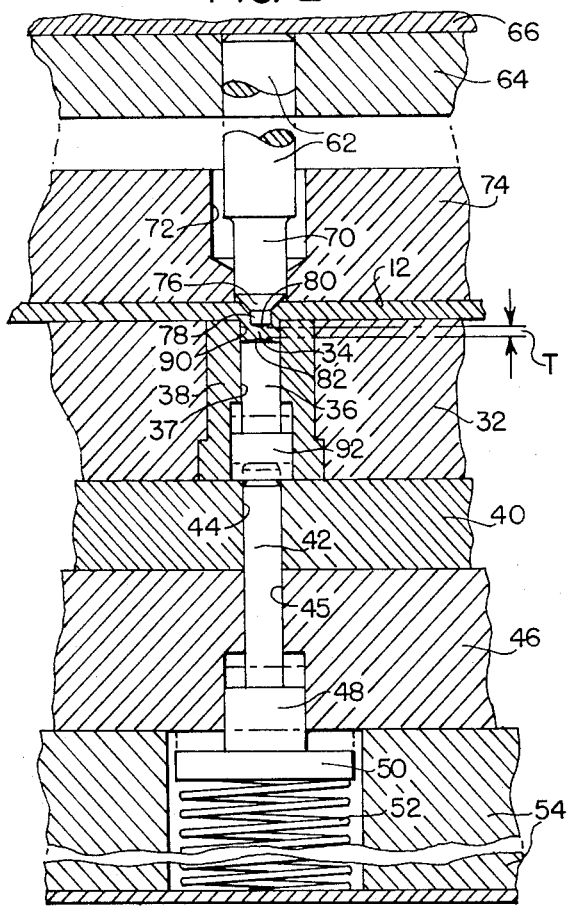
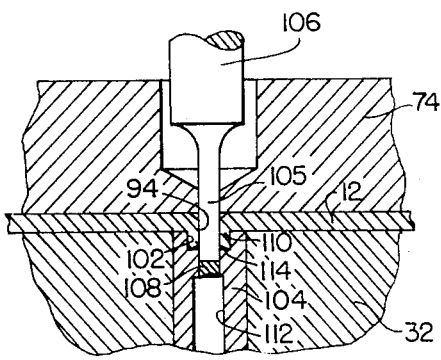

*INVENTOR.*
VERNER A. JOHNSON
BY Benjamin Wasserman
ATTORNEY

METHOD AND APPARATUS FOR EXTRUDING A RIVET FORM IN A LAYER OF METALLIC MATERIAL

The invention relates to a system for extruding an elongated solid or tubular rivet from one layer of metallic material to be conjoined to a second layer of metallic or non-metallic material by the extruded rivet at an opening in the second layer. An essential requirement is to extrude the rivet form to a length such that it extends substantially beyond the thickness of the metal to be conjoined thereby. For example, a sheet of metal 0.102 inch thick can be processed to extrude a rivet body extending beyond the plane of the metal a distance of substantially 0.130 inches, an increase of 27-½ percent over the thickness of the metal layer. This extruded rivet form will conjoin a second layer of metal of 0.105 inch thickness to the first layer, by passing the rivet body through an opening in the second sheet and staking or peening the end of the rivet form upon the second sheet about the opening. The metallic materials to which the invention can be applied include hot and cold rolled steels of relatively low carbon content, as for example 1009, 1010, and 1020 grades with any finish, stainless steel grades which have been spherodized annealled, most grades of brass, copper, aluminum of extrusion quality, and other metals in alloy or composition grades which qualify for cold formed extrusions.

At the present time, the economics of metal processing and assembly are such that reduction in cost is a prime necessity, demanding special and inventive working of the metals. The elimination of the more expensive individual rivets, requiring that they be separately applied and located one by one in the layers of metal to be conjoined before peening or staking, is a most desirable and necessary goal. The invention hereindisclosed meets that goal.

The process by which the extruded elongated solid or tubular rivet form is produced forms a part of the invention disclosed herein. The process includes deforming the metal layer to form the rivet body in a single operation, so that metal in the central axial zone of the rivet form is caused to flow axially and laterally between the driving surfaces of a punch and the crown end of an anvil, toward the peripheral edges of the die cavity in which the tools are operative, to produce the rivet form. A substantial quantum of metal is thus translated forwardly of the punch end to elongate the rivet form beyond the thickness of the metal layer from which the rivet is produced. The second sheet of metal is provided with a perforation for and to receive the rivet body, the hole edge being square with the metal sheet or chamfered on the side at which conjunction, by staking of the rivet end, is effected. The rivet end is peened or staked upon the second sheet in the area about the opening, securing the two layers of metal firmly together.

It is an object of the invention to produce a solid or tubular rivet form by extrusion directly from a sheet or layer of metal to be conjoined to another similar layer, the rivet form having a body length beyond the plane of the sheet substantially greater than the thickness of the metal sheet from which it is formed. Another object is to provide a process and tooling for extruding such elongated rivet, in tubular or solid form. A further object is to extrude the rivet body from a metal sheet by squeezing the metal forwardly of the extrude punch into the die cavity and against a yielding resistant anvil toward each side of the die cavity and about the crowned end of the anvil. Still another object is to provide process means for producing elongated rivet forms from a lamina of metal, whereby a conjunction of metal sheets can be more economically effected.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which FIG. 1 is a vertical sectional view of metal base and second sheets assembled in accordance with the invention.

FIGS. 2 and 3 are vertical sectional views of tooling piercing (FIG. 2) and chamfering (FIG. 3) the rivet receiving hole in the second sheet.

FIG. 4 is a vertical sectional view of tooling extruding the solid rivet form from the base sheet.

FIG. 5 is a vertical sectional view of the pierce extrusion operation forming a tubular rivet from the solid rivet form illustrated in FIG. 4.

Figure 6:
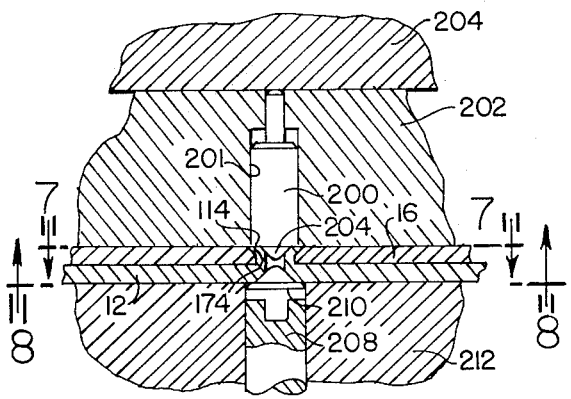
FIG. 6 is a vertical sectional view of the tooling staking the tubular rivet form illustrated in FIG. 5 in an assembly of the base and second sheets.
Figure 7:
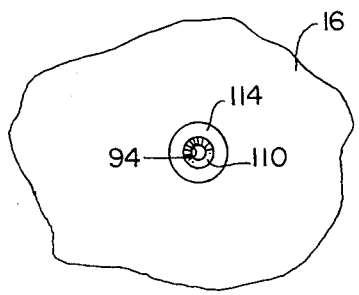
Figure 8:
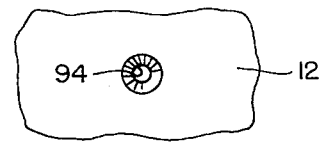

FIGS. 7 and 8 are plan views taken substantially in the directions shown on the lines 7—7 and 8—8 of FIG. 6.

Figure 9:
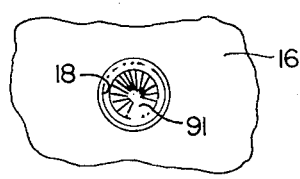

FIG. 9 is a plan view taken in the direction shown substantially on the line 9—9 of FIG. 1.

Figure 10:
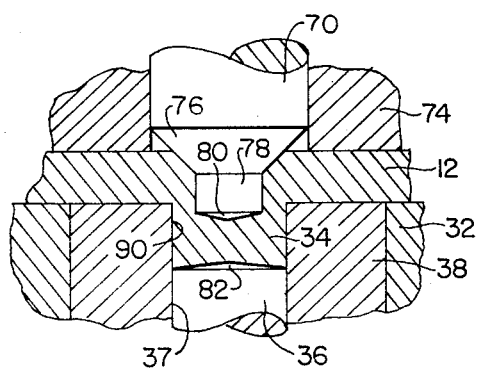

FIG. 10 is an enlarged vertical sectional view of the tooling extruding the solid rivet form, as shown in FIG. 4.

Figure 11:
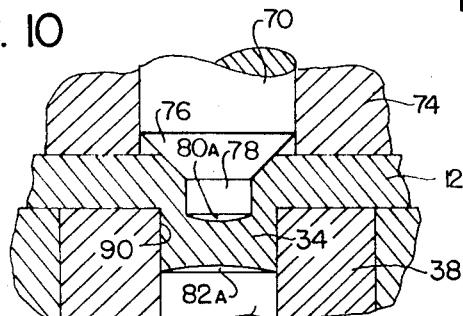

FIG. 11 is an enlarged view similar to FIG. 10, illustrating a slightly modified form of the extrusion tooling.

Figure 12:
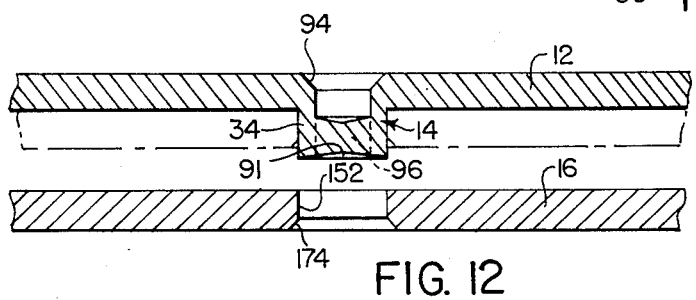

FIG. 12 is an enlarged vertical sectional view of spaced apart base and second sheets embodying the inventive construction.

As illustrated particularly in FIG. 1, the metallic sheet assembly 10 comprises the base sheet 12 from which the solid rivet form 14 is extruded, and the assembled second sheet 16 having the perforation or opening 18 through which the rivet 14 is passed and about which the rivet end 20 is peened or staked to secure the sheets 12 and 16 closely together.

It will be understood that the relative thickness of the metal sheets 12 and 16 cannot be illustrated with any precision in the drawings. It will be further understood by persons skilled in the art to which the invention pertains that the relative thicknesses of the two sheets vary according to the requirements of particular applications to which the invention hereindisclosed is directed. In some instances, the thickness of the second sheet is greater than that of the base sheet. When such thickness is substantially greater, the pierced hole in the second sheet is chamfered to receive the staked end of the rivet form (FIGS. 3 and 6).

As has been noted above in the preliminary portion of this specification, a base sheet of 0.102 inch thickness has been firmly assembled with and secured to a second sheet of 0.105 inch thickness. This was accomplished by extruding a rivet form having a body length beyond the plane of the base sheet of 0.130 inch so that when the two sheets were assembled with the rivet body extending through the opening in the second sheet, the rivet end extended approximately 0.025 inch beyond the outer face of the second sheet. This extra length provided sufficient rivet body for peening and staking upon the second sheet within the area of the chamfer provided in the second sheet.

To produce the extruded elongated rivet form of this invention, reference is made to FIGS. 4 and 5 of the drawings. The base sheet 12 is placed upon the button retainer 32, the extruded elongated rivet body 34 being formed in the area over and upon the extrude anvil 36 disposed in the cylindrical opening 37 of the extrude button 38 secured in the button retainer 32 upon the backing plate 40. A pressure pin 42 is axially movably disposed in the opening 44 and 45 in backing plate 40 and die block 46, respectively. According to conventional practice, the base 48 of the pressure pin 42 is seated upon the spacer disc 50 biased upwardly by the spring 52 in the lower die shoe 54.

The extrude and chamfer punch 62 has its shank secured in the punch retainer 64 under the backing plate 66 and the upper die shoe (not shown). The extrude punch shank portion 70 is disposed in the counterbore and countersunk opening 72 of the stripper 74 that bears upon the upper face of the base metal layer 12 during the extrusion operation. The extrude punch shank portion 70 terminates in a tapered chamfer section 76 and an extrude pin portion 78 which has a conical taper 80 formed on its distal end.

In the specific metal sheet assembly example referred to hereinabove, the extrude punch tapered chamfer portion 76 has its frusto-conical surface at an angle of substantially 45° to a horizontal plane normal to the axis of the tool, and the cylindrical pin portion 78 is of 0.150 inch diameter. The punch tool's distal conical end 80 has a taper at an angle of 5°±1° to a horizontal plane normal to the tool axis at the peak of the tapered crown end. The tapered end 82 of the extrude anvil 36 is provided with a similar taper of substantially 5°±1° to the horizontal plane normal to the axis of the anvil.

Before the conical tip 80 and pin portion 78 of the extrude and chamfer punch 62 are lowered and strike the base metal sheet 12, the tapered crown end 82 of the extrude anvil 36 bears against the underside of the sheet 12, being biased thereagainst by the pressure pin 42. Note the broken line indicator of this relationship in FIG. 4. The rivet body 34 is extruded into the button retainer cavity 90, upon the extrude anvil conical tip 82 which forms the rivet end dimple 91 (FIG. 10), as the extrude punch chamfer 76, punch pin 78, and tapered crown end 80 enter, drive and extrude the base metal into the cavity 90, forcing the extrude anvil 36 downwardly until its base flange 92 bottoms upon the backing plate 40.

In this extrusion operation, a critical dimension is the distance between the peak of the extrude punch conical end 80 and the peak of the extrude anvil conical end 82. This dimension T is related directly to the amount of metal required to be squeezed into the cavity 90 over and closely about the extrude anvil conical end 82 and the extrude punch pin 78 and conical end 80. The smaller this dimension T becomes, the more metal is being forced into cavity 90 toward and upon the extrude anvil end, whereby a substantially elongated rivet body 34 is formed. It will be recognized that the crown ends of the extrude punch and the extrude anvil, which may be conically tapered as shown (FIGS. 4 and 10) or, alternatively, convexly curved in surface configuration (FIG. 11), determine primarily the directions and extent of flow of the metal base layer 12 into the rivet form 34 described above and illustrated in FIG. 4. Similar advantageous results can be and have been produced with the convexly curved extrude punch end face 80a and the extrude anvil end face 82a, substantially as illustrated in FIG. 11.

Another factor affecting the amount of elongation which can be produced by the hereindisclosed process and tooling is that of the outside diameter of the rivet form. It will be recognized that when the rivet body has a relatively small diameter, the volume of metal displaced, $.D^2/4.L$, is geometrically much less than when the diameter is greater. It is this volume of metal displaced that provides the exceptional elongation of the inventive rivet form.

By highly polishing the distal crown ends of the extrude punch and anvil, the metal of the base sheet is caused to flow over the anvil end 82 and into the lower reaches of the die cavity 90 thereabout, extending the length of the rivet body 34 to an unusual degree.

Although the rivet form 14, having the axial countersunk/counterbored cavity 94 at its upper end and the dimple 91 at its distal end, is herein referred to as a solid rivet form, such terminology is used, in view of the presence of the intermediate body portion 96, to distinguish this rivet form from the tubular rivet form 100 described below. The height and/or thickness of the intermediate body portion 96 (FIG. 10) will, of course, vary in dimension depending upon the thickness of the base metal layer 12, the presence or absence of the extrude punch chamfer 76, which can be eliminated in some instances, the diameter of the die cavity 90, the diameter and depth of penetration of the punch pin 78, and whether the intermediate body portion 96 is to be removed and the solid rivet form 34 converted into the tubular rivet form 100.

To form the tubular rivet 100 (FIG. 5), the solid rivet body 34 is placed in the cavity 102 above button retainer insert 104. The punch pin 105 of piercing punch 106 secured in the punch retainer 64 is forced downwardly through the axial intermediate body portion 96 of the rivet body 34, piercing a slug 108 from the rivet body and thus forming it into the tubular body section 110. The slug drops through the opening 112 in the button retainer 32, and through openings axially aligned therewith in the lower backing plate, die block and die shoe 40, 46 and 54 respectively. The extruded elongated tubular rivet body portion 110, of a length substantially that of the solid rivet body, is utilized in a similar manner by staking the inwardly inclined rivet distal end 114 upon the second sheet 16, conjoining the base sheet 12 thereto.

The second sheet 16 is prepared to receive the solid rivet form 34 or the tubular ribet form 100 by a piercing operation (FIG. 2), with or without a secondary chamfering operation (FIG. 3), as follows. The second sheet 16 is placed upon a pierce insert 130 supported on a retainer block 132 secured to a lower die shoe. A pierce punch 136 is mounted in a punch retainer under a backing plate and the upper die shoe, according to currently conventional practice. The pierce punch pin portion 144 is passed through the opening 145 in the stripper 146, which bears upon the upper face of the second sheet 16, to pierce a slug 148 from the second sheet, through the pierce insert 130 and into its discharge passage 150.

Normally, a burr or ragged edge of greater or lesser measure is produced at the downstream edge of the opening 152 in metal sheet 16 when the pierce punch pin 144 passes therethrough. If the burr is excessive or must be removed, a secondary deburring or chamfering operation is performed, either by use of a conventional deburring or chamfering tool, or by a chamfering punch. In the latter instance, the second sheet 16 is placed upon the button retainer 160 securing the chamfer punch 162 upon backing plate 164 in the retainer block 166. The leading cylindrical pin end 168 of the chamfer punch is placed in the second sheet opening 152 formed by the pierce punch pin portion 144. The restrike insert 170, supported upon and secured to the upper backing plate 171 under the upper die shoe, bears downwardly upon the second sheet 16 forcing it upon the chamfer portion 172 of chamfer punch 162, a portion of which enters the aligned opening 173 in the insert 170. Upon removal of the second sheet 16 from the chamfer punch, the opening 152 is now provided with the internal chamfer 174 at one side of the sheet.

The assembly staking or peening operation for the tubular rivet form 100 is illustrated in FIG. 6. The movable staking insert 200 is disposed in the bore 201 of the retainer block 202 secured to the upper die shoe 204. The working end 206 of the movable stake insert is adapted to bear upon the distal end 114 of the tubular rivet form 100, or the conically recessed distal end 91 of the solid rivet body 34, to stake, peen or flare such end outwardly upon the second sheet 16, conjoining the base sheet 12 thereto. A staking anvil 208 with its stationary stake insert 210 is presented to the base sheet in the chamfered counterbore 94, formed by the extrude punch pin portions 76, 78, 80, to support the rivet form during the staking operation. The base sheet rests upon the support block 212 in which the stake anvil 208 is disposed. The stake insert 210 centers the rivet form in alignment with the movable stake insert 200, and when the insert portion 206 bears fully upon the rivet end, that end is flared outwardly into and about the second sheet chamfer 174. Ample clearance is provided between the opposed ends of the two stake inserts 200 and 210 so that there is no danger of smashing the tools or the parts being staked. The staking anvil 208 is mounted and supported upon a backing plate and a lower die shoe (not shown).

The extruded elongated rivet form 14 is produced by driving the metal in base sheet 12 axially forward into the die cavity 90 against the spring biased extrude anvil end 82. The unexpected elongation produced is achieved by means of the extrude punch chamfer 76, the punch pin portion 78 and its conical crown end 80 in conjunction with the tapered crown end 82 of the extrude anvil 86. As the extrude punch pin and crown end 78,80 enter the base sheet 12, the metal in its path and adjacent thereto flows axially, laterally and vectorially in the die cavity 90 toward and upon the tapered crown end 82 of the extrude anvil, filling the cavity. The extrude punch chamfer 76, entering the sheet 12, further implements this flow of metal axially toward the extrude anvil, whereby exceptional elongation of the rivet body is achieved.

The extrude operation, involving the conjunctive functions of the extrude and chamfer punch 62 and the extrude anvil 36, to form the solid rivet form 34 or the tubular rivet form 100, utilizes a primary concept of the invention. That concept, by means of the tooling and processing hereindisclosed, results in an extruded elongated rivet form of exceptional length from the base sheet, for a conjunction with the second sheet. Currently conventional practice requires piercing operations in the base and second sheets, automatic, semi-automatic or manual positioning of a standard preformed rivet in the aligned openings of these sheets, and staking the rivet end over to conjoin the two sheets.

The end face 80 of the extrude punch 70 and the end face 82 of the extrude anvil 36 have been illustrated as being conical and alternatively as a convexly curved surface. These surfaces must be highly polished and smooth in order to obtain the flow of metal that produces the elongated rivet form 14. The crown configuration of the polished extrude punch and anvil faces is related to the hardness of the sheet material being deformed. The harder the sheet material, the more crown is required in order to improve the flow of metal across the face of the extrude punch and anvil.

The upward pressure of the spring 52 is directly related to the spread and flow of metal between the extrude punch and anvil as these tools are moving downwardly and before the base flange 92 of the extrude anvil bottoms upon the backing plate 40. The value of the spring pressure is also related to the hardness of the metal being deformed. Persons skilled in the art of die and tool fabrication and their usage will be able to determine these values with relative ease and little experimentation.

Although the second layer or sheet 16 has been described herein as comprising a layer of metallic sheet material, it is to be understood that such second layer, or portion thereof, can take the form of a molded, extruded, or rolled portion of a plastic or composition material provided with the opening 152 adapted to receive the solid rivet body 34 or the tubular body portion 110.

It has been established that the economics of the inventive method and construction hereindisclosed result in a very substantial saving over the conventional riveting assembly process heretofore and currently used. This economic advantage is supplemented by a very positive assembly and conjunction of the two sheets of material, equal or superior to the assembly values of conventional practice.

In this specification, reference has been made to low carbon "soft" steels, stainless steel, copper, aluminum and other metallic materials having extrusion elongation factors or characteristics permitting formation of the rivet forms and assemblies hereindescribed and illustrated. It will be understood that the metals referred to do not comprise the entire list of metallic materials to which the invention is applicable, and that such list of metals is not to be considered a limitation upon the application or utilization of the invention.

Although certain particular embodiments of the invention are hereindisclosed for purposes of explanation, further modifications thereof, after study of this specification, will become apparent to those skilled in the art to which the invention pertains. Reference should be had to the appended claims in determining the scope of the invention.

We claim:

1. Tooling to cold extrude an elongated rivet form in and from a layer of metallic material as a part thereof, comprising an extrude punch having a highly polished crowned distal end face, punch support means adapted to impel said punch end face into a portion of said metallic layer, a die adapted to receive said layer portion extruded thereinto by said extrude punch, an extrude anvil sliding movable in said die and having a highly polished crowned distal end face adapted to yieldingly resist movement of said extruded layer portion in said die, and means supporting said anvil for sliding movement in said die and for yieldingly resistant contact with said extruded layer portion, said punch adapted to force said extruded layer portion into the recesses of said die against and across said crowned distal end face of said yieldingly resistant anvil, said punch and anvil crowned end faces being axially aligned and in opposing crown relationship.

2. The tooling defined in claim 1, wherein said extrude punch end face is conical in form.

3. The tooling defined in claim 1, wherein said extrude punch end face is convexly curved in form.

4. The tooling defined in claim 1, wherein said extrude anvil end face is conical in form.

5. The tooling defined in claim 1, wherein said extrude anvil end face is convexly curved in form.

6. The tooling defined in claim 1, wherein said extrude punch is provided with a chamfering portion rearwardly of its end face, to increase the amount of said layer portion forced into said die recesses and against said crowned anvil end face, whereby said rivet body length is further elongated.

7. The tooling defined in claim 1, and including a piercing punch secured in impelling support means and adapted to axially pierce said rivet body to form a tubular rivet body.

8. The process of cold extruding an elongated rivet form in and from a layer of metallic material as a part thereof, comprising the steps of 1. disposing a portion of said metallic layer over a die cavity between an extrude punch and a yieldingly resistant extrude anvil, said extrude punch having a distal projecting highly polished crowned end face disposed adjacent one side of said layer portion and said extrude anvil axially aligned in said die cavity with said extrude punch and having a distal projecting highly polished crowned end face placed adjacent the other side of said layer portion, said end faces being aligned and in opposing crowned relationship about said layer portion therebetween, 2. striking and entering said layer portion with the extrusion crowned end of said punch to force said layer portion into said die cavity and upon said anvil crowned end face, 3. forcing said layer portion in said die cavity to the inner recesses thereof against the yielding resistance of said anvil and elongating said rivet form body in said die cavity over and about the projecting crowned end face of said anvil, 4. and leaving a solid rivet body portion intermediate said punch end face and said anvil end face at the end of the punch stroke.

9. The process defined in claim 8, and including the step of axially piercing said intermediate solid portion from said rivet body to form a tubular rivet body.

10. The process defined in claim 8, wherein said layer portion is struck and entered by an extrude punch having a distal conical end face.

11. The process defined in claim 8, wherein said layer portion is struck and entered by an extrude punch having a distal convexly curved end face.

12. The process defined in claim 8, wherein said layer portion is forced into said die cavity against an extrude anvil having a distal concial end face.

13. The process defined in claim 8, wherein said layer portion is forced into said die cavity against an extrude anvil having a distal convexly curved end face.

14. The process defined in claim 8, and including the step of striking and entering said layer portion with a chamfer zone on said punch rearwardly of said punch end face to force an additional quantum of said layer portion into said die cavity, whereby to further increase the elongation of said rivet body.

* * * * *

Disclaimer

3,771,480.—*Verner A. Johnson*, Livonia, Mich. METHOD AND APPARATUS FOR EXTRUDING A RIVET FORM IN A LAYER OF METALLIC MATERIAL. Patent dated Nov. 13, 1973. Disclaimer filed Nov. 23, 1973, by the assignee, *Johnson Die & Engineering Co.*

Hereby disclaims the portion of the term of said patent subsequent to May 8, 1990.

[*Official Gazette March 12, 1974.*]

UNITED STATES PATENT OFFICE
CERTIFICATE OF CORRECTION

Patent No. 3,771,480        Dated November 13, 1973

Inventor(s) Verner A. Johnson

It is certified that error appears in the above-identified patent and that said Letters Patent are hereby corrected as shown below:

column 7, line 7, claim 1, "sliding" should read
    -- slidingly --.

column 8, line 33, claim 12, "concial" should read
    -- conical --.

Signed and sealed this 1st day of October 1974.

(SEAL)
Attest:

McCOY M. GIBSON, JR.           C. MARSHALL DANN
Attesting Officer              Commissioner of Patents